(12) United States Patent
Zou et al.

(10) Patent No.: US 12,151,705 B2
(45) Date of Patent: Nov. 26, 2024

(54) SCENE CREATION SYSTEM FOR AN AUTONOMOUS VEHICLE

(71) Applicant: GM Global Technology Operations LLC, Detroit, MI (US)

(72) Inventors: Guangyu Jeff Zou, Warren, MI (US); Brent Navin Roger Bacchus, Sterling Heights, MI (US); Michael Alan Losh, Rochester Hills, MI (US); Indranil Palit, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 186 days.

(21) Appl. No.: 18/157,880

(22) Filed: Jan. 23, 2023

(65) Prior Publication Data
US 2024/0246558 A1 Jul. 25, 2024

(51) Int. Cl.
*B60W 60/00* (2020.01)
*B60W 40/06* (2012.01)
*G01C 21/00* (2006.01)

(52) U.S. Cl.
CPC .......... *B60W 60/001* (2020.02); *B60W 40/06* (2013.01); *G01C 21/3822* (2020.08); *B60W 2552/53* (2020.02); *B60W 2556/00* (2020.02)

(58) Field of Classification Search
CPC .... B60W 60/00; B60W 60/001; B60W 40/06; B60W 2552/53; B60W 2556/00; G01C 21/00; G01C 21/3822
See application file for complete search history.

(56) References Cited

U.S. PATENT DOCUMENTS 11,585,669 B2* 2/2023 Kundu ............... G01C 21/3446
2020/0192365 A1* 6/2020 Russell ............. B60W 30/0956

* cited by examiner

*Primary Examiner* — Tan Q Nguyen
(74) *Attorney, Agent, or Firm* — Vivacqua Crane, PLLC

(57) ABSTRACT

A scene creation system for an autonomous vehicle includes one or more controllers executing instructions to receive perception data and map data of a roadway the autonomous vehicle is traveling along, and identify a plurality of lane segments of the roadway that the autonomous vehicle travels along based on the perception data and the map data. The one or more controllers connect the plurality of lane segments together based on a spatial relationship between the plurality of lane segments to create a lane graph. The one or more controllers classify each of the plurality of lane segments of the lane graph to one or more lane attributes and reassemble the plurality of lane segments to create a representation of the roadway. The one or more controllers recreate a scene of an environment surrounding the autonomous vehicle based on the representation of the lanes that are part of the roadway.

20 Claims, 6 Drawing Sheets

SCENE CREATION SYSTEM FOR AN AUTONOMOUS VEHICLE

The present disclosure relates to a scene creation system for an autonomous vehicle, where the scene creation system segments, classifies, and reassembles perception and map data to recreate a scene of an environment surrounding the autonomous vehicle.

An autonomous driving system for a vehicle is a complex system that includes many different aspects. For example, an autonomous driving system may include multiple sensors to gather perception data with respect to the vehicle's surrounding environment. Sometimes the perception data collected by the sensors may be subject to inaccuracies, performance limitations, and noise. For example, motion may cause the image data collected by one or more cameras to become blurry. As another example, radar and LiDAR sensors may be affected by inclement weather conditions such as rain, fog, or snow. In addition to the sensors, the autonomous driving system also utilizes map data as well. However, sometimes there may be missing or inaccurate information existing within the map data. For example, changes in the road network may have occurred since the map data was collected because of construction. Also, due to budgetary constraints, sometimes roads may not be fully surveyed.

Thus, while autonomous driving systems achieve their intended purpose, there is a need in the art for determining an improved representation of the vehicle's surroundings.

SUMMARY

According to several aspects, a scene creation system for an autonomous vehicle is disclosed, and includes one or more controllers executing instructions to receive perception data and map data of a roadway the autonomous vehicle is traveling along. The one or more controllers identify a plurality of lane segments of the roadway that the autonomous vehicle travels along based on the perception data and the map data. The one or more controllers connect the plurality of lane segments together based on a spatial relationship between the plurality of lane segments to create a lane graph. The one or more controllers classify each of the plurality of lane segments of the lane graph to at one or more lane attributes, where the lane attributes represent one or more permitted maneuvers associated with each lane segment. The one or more controllers reassemble the plurality of lane segments based on the spatial relationship between the plurality of lane segments and the lane attributes for each lane segment to create a representation of the roadway. The one or more controllers recreate a scene of an environment surrounding the autonomous vehicle based on the representation of lanes that are part of the roadway.

In another aspect, the one or more controllers execute a heuristic-based algorithm that applies one or more rule-driven techniques to partition the roadway into the lane segments.

In yet another aspect, the rule-driven techniques partition the roadway by detecting geometrical changes in the roadway.

In an aspect, the geometrical changes in the roadway indicate a permitted maneuver is added to the roadway.

In another aspect, the spatial relationship between the lane segments includes one of the following: upstream, downstream, left, and right.

In yet another aspect, the one or more controllers classify the plurality of lane segments by: building a node map that represents the lane graph as a network of interconnected nodes, where each of the plurality of lane segments of the lane graph are represented by a node.

In an aspect, the one or more controllers classify the plurality of lane segments by building a feature vector for each node that is part of the node map and executing a heuristic-based logic to classify a corresponding lane segment for a particular feature vector to one or more particular lane attributes.

In another aspect, a look-up table and a logic tree first check the corresponding lane segment for the particular feature vector to for a special lane attribute before executing the heuristic-based logic.

In yet another aspect, the nodes of the node map are connected to one another by edges, and where the edges signify the spatial relationship between the lane segments.

In an aspect, the feature vector is a numerical representation of one or more characteristics of a corresponding node, one or more characteristics of neighboring nodes connected to the corresponding node, and the spatial relationship between the corresponding node and the neighboring nodes.

In another aspect, the lane attributes include one or more of the following: straight, turn left, turn right, bi-directional, split, and parking.

In yet another aspect, the one or more controllers execute instructions to transmit the scene to an autonomous vehicle planner.

In an aspect, recreating the scene includes building lanes that are part of the roadway by extending the plurality of lane segments that are a primary lane, building roads that are part of the roadway based on a driving direction of neighboring lane segments and building maneuvers that are assigned to each lane.

In another aspect, a method for recreating a scene of an environment surrounding an autonomous vehicle by a scene creation system is disclosed. The method includes receiving, by one or more controllers, perception data and map data of a roadway the autonomous vehicle is traveling along. The method also includes identifying, by the one or more controllers, a plurality of lane segments of the roadway that the autonomous vehicle travels along based on the perception data and the map data. The method also includes connecting, by the one or more controllers, the plurality of lane segments together based on a spatial relationship between the plurality of lane segments to create a lane graph. The method also includes classifying, by the one or more controllers, each of the plurality of lane segments of the lane graph to more or more lane attributes, where the lane attributes represent one or more permitted maneuvers associated with each lane segment. The method includes reassembling, by the one or more controllers, the plurality of lane segments based on the spatial relationship between the plurality of lane segments and the lane attributes for each lane segment to create a representation of the roadway. The method includes recreating, by the one or more controllers, a scene of an environment surrounding the autonomous vehicle based on the representation of the roadway. The method includes transmitting the scene to an autonomous vehicle planner.

In yet another aspect, a scene creation system for an autonomous vehicle is disclosed. The scene creation system comprising one or more controllers executing instructions to receive perception data and map data of a roadway the autonomous vehicle is traveling along. The one or more controllers identify a plurality of lane segments of the roadway that the autonomous vehicle travels along based on the perception data and the map data. The one or more controllers connect the plurality of lane segments together based on a spatial relationship between the plurality of lane segments to create a lane graph. The one or more controllers classify each of the plurality of lane segments of the lane graph to one or more lane attributes, where the lane attributes represent one or more permitted maneuvers associated with each lane segment, and where the one or more controllers classify a feature vector by building a node map that represents the lane graph as a network of interconnected nodes, where each of the plurality of lane segments of the lane graph are represented by a node, building the feature vector for each node that is part of the node map, and executing a heuristic-based logic to classify a corresponding lane segment for a particular feature vector to one or more particular lane attributes. The one or more controllers reassemble the plurality of lane segments based on the spatial relationship between the plurality of lane segments and the lane attributes for each lane segment to create a representation of the roadway. The one or more controllers recreate a scene of an environment surrounding the autonomous vehicle based on the representation of the roadway.

In another aspect, the one or more controllers execute a heuristic-based algorithm that applies one or more rule-driven techniques to partition the roadway into the lane segments.

In yet another aspect, the rule-driven techniques partition the roadway by detecting geometrical changes in the roadway.

In an aspect, the geometrical changes in the roadway indicate a permitted maneuver is added to the roadway.

In another aspect, the spatial relationship between the lane segments includes one of the following: upstream, downstream, left, and right.

In yet another aspect, a look-up table and a logic tree first check the corresponding lane segment for the particular feature vector to for a special lane attribute before executing the heuristic-based logic.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
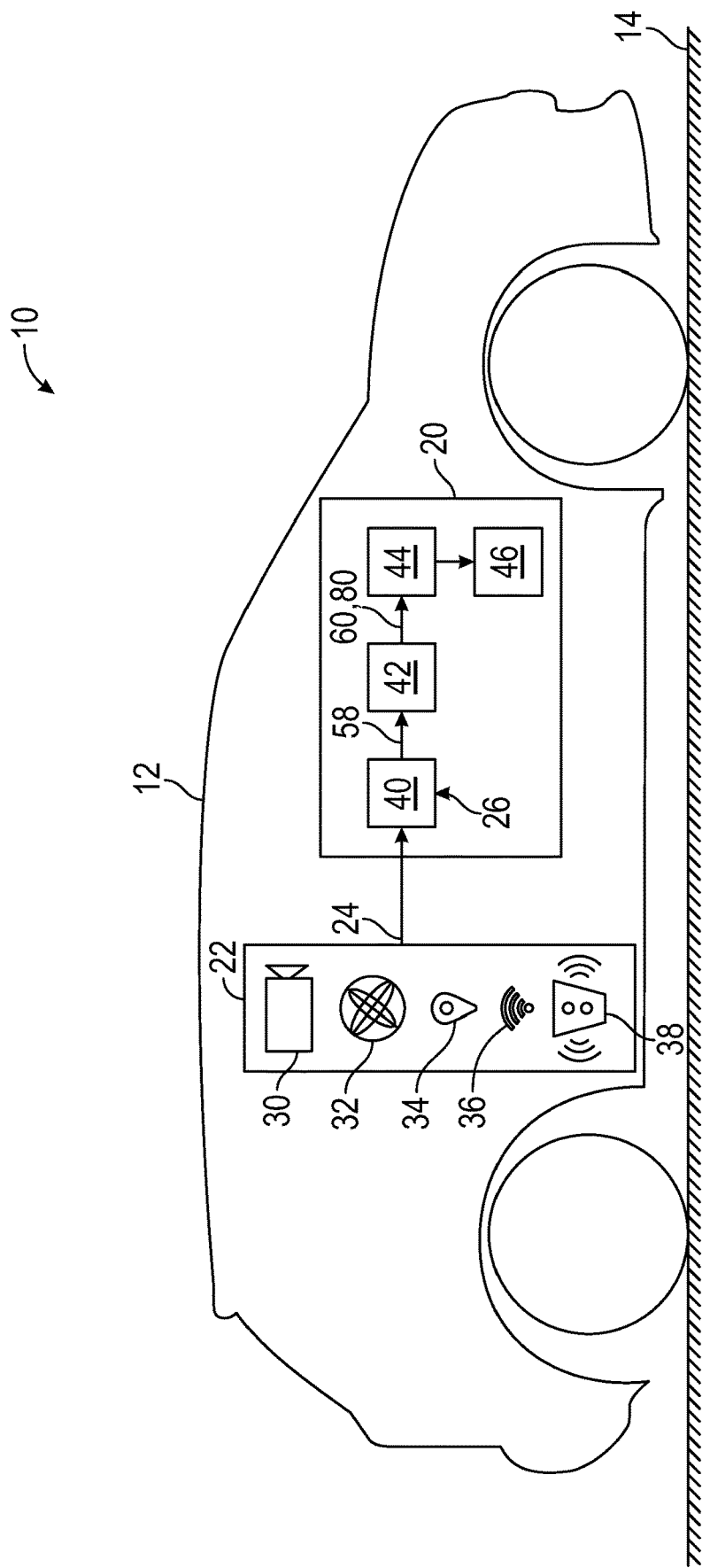
FIG. 1 is a schematic diagram of a vehicle including the disclosed scene creation system, where the scene creation system includes one or more controllers, according to an exemplary embodiment.

Referring to FIG. 1, an exemplary scene creation system 10 for an autonomous vehicle 12 is illustrated. It is to be appreciated that the autonomous vehicle 12 may be any type of vehicle such as, but not limited to, a sedan, truck, sport utility vehicle, van, or motor home. The autonomous vehicle 12 may be a fully autonomous vehicle including an automated driving system (ADS) for performing all driving tasks or a semi-autonomous vehicle including an advanced driver assistance system (ADAS) for assisting a driver with steering, braking, and/or accelerating.

The scene creation system 10 includes one or more controllers 20 in electronic communication with a plurality of sensors 22 configured to collect perception data 24 indicative of an environment surrounding the autonomous vehicle 12. In the non-limiting embodiment as shown in FIG. 1, the plurality of sensors 22 include one or more cameras 30, an inertial measurement unit (IMU) 32, a global positioning system (GPS) 34, radar 36, and LiDAR 38, however, is to be appreciated that additional sensors may be used as well. In addition to receiving the perception data 24 from the plurality of sensors 22, the one or more controllers 20 also receives map data 26 as well. The perception data 24 from the plurality of sensors 22 indicates lane-level information regarding a roadway 14 that the autonomous vehicle 12 is traveling along. The map data 26 indicates road-level information of the roadway 14.

As seen in FIG. 1, one or more controllers 20 include a segmentation module 40, a classifier module 42, and a scene building module 44. The disclosed scene creation system 10 providing an approach to create a lane graph 58 (FIG. 3) composed of a plurality of lane segments 60 (FIG. 3) of the roadway 14 based on the perception data 24 and the map data 26, classify the lane segments 60, reassemble the lane segments 60, reassemble the lane segments 60, and recreate a scene of the environment surrounding the autonomous vehicle 12. The scene of the environment surrounding the autonomous vehicle is transmitted to an autonomous vehicle planner 46, which uses the scene for planning purposes. It is to be appreciated that each lane segment 60 is classified to one or more lane attributes, where the lane attribute represents one or more permitted maneuvers associated with each lane segment 60. Some examples of lane attributes include, but are not limited to, straight, turn left, turn right, bi-directional, split, non-drivable, straight-plus-left, straight-plus-right, and parking.

Figure 2:
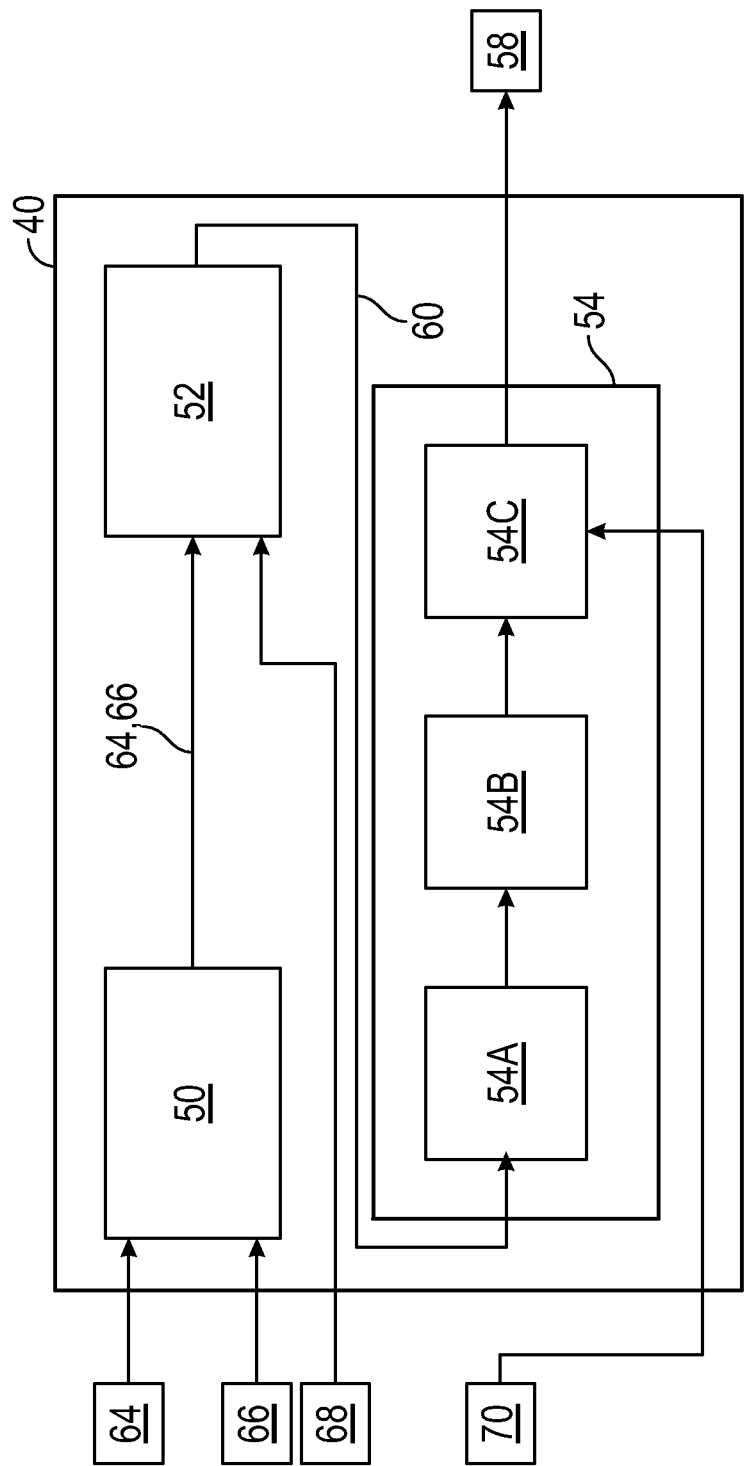
FIG. 2 is a block diagram of a segmentation module that is part of the one or more controllers shown in FIG. 1, according to an exemplary embodiment.
Figure 3:
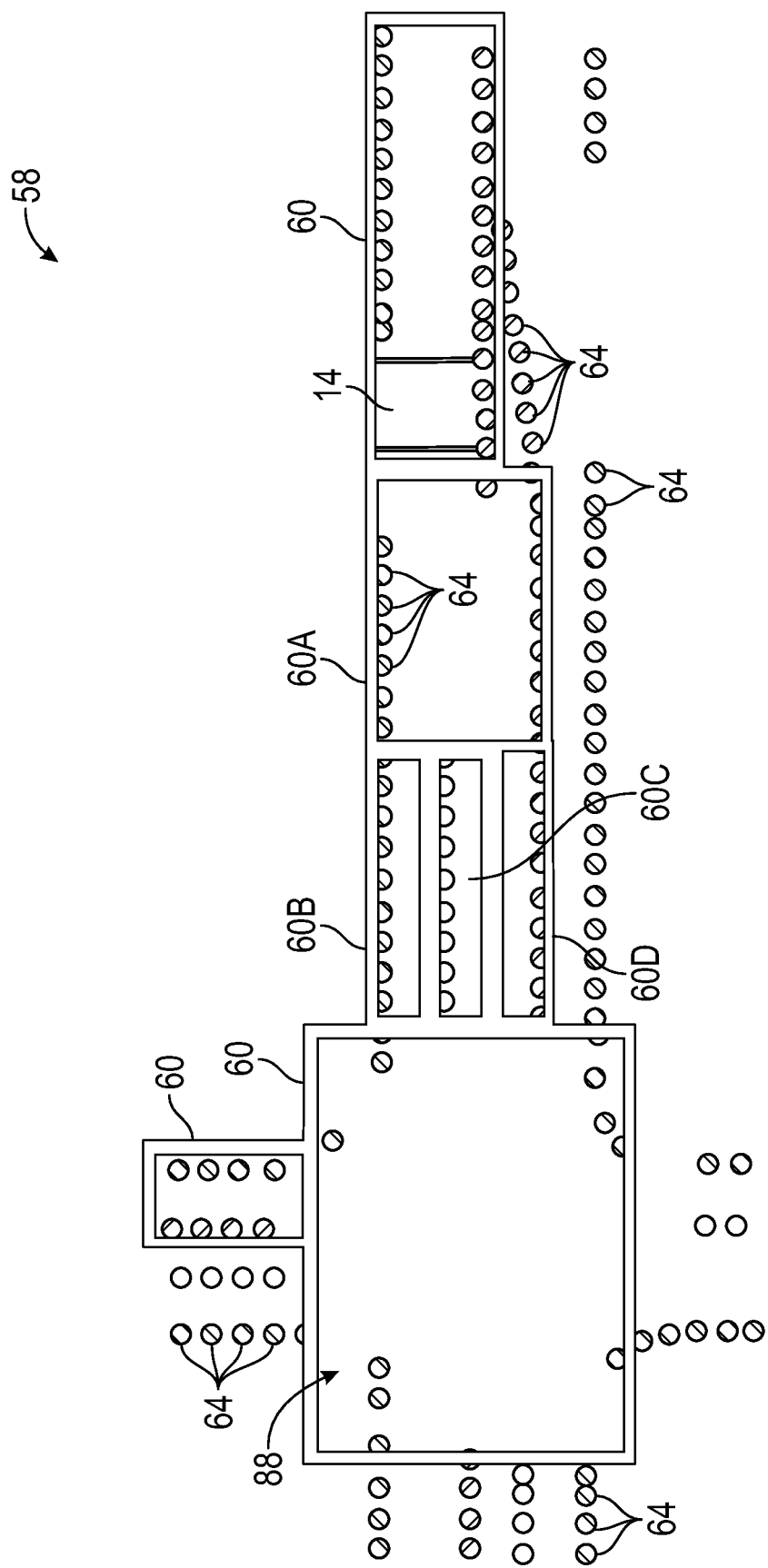
FIG. 3 is an illustration of an exemplary lane graph determined by the segmentation module shown in FIG. 2, according to an exemplary embodiment.

FIG. 2 is a block diagram of the segmentation module 40, and FIG. 3 is an illustration of an exemplary lane graph 58 of the roadway 14 that the autonomous vehicle 12 is traveling along. Referring to FIGS. 1-3, the segmentation module 40 of the one or more controllers 20 receives the perception data 24 and the map data 26 of the roadway 14 that the autonomous vehicle 12 is traveling along as input and determines the lane graph 58 including the plurality of lane segments 60 based on the input.

Referring to both FIGS. 2 and 3, the segmentation module 40 includes a preprocessing block 50, an identifier block 52, and a node adjacency block 54. The segmentation module 40 identifies the plurality of lane segments 60 of the roadway 14 that the autonomous vehicle 12 travels along based on the perception data 24 and the map data 26 of the roadway 14. The segmentation module 40 also connects the plurality of lane segments 60 together based on a spatial relationship with one another to create the lane graph 58. The spatial relationship between the plurality of lane segments 60 indicates if a neighboring lane segment 60 is located upstream, downstream, left, or right of a particular lane segment 60. Upstream is understood as a portion of the roadway 14 prior to the current portion, i.e., earlier in the flow of traffic. Conversely, downstream is understood as a portion of the roadway 14 to be reached in the future, e.g., where traffic is flowing. For example, as seen in FIG. 3, the single lane segment 60A is located downstream from lane segments 60B, 60C, 60D. Lane segment 60B is to the left of lane segment 60C, and lane segment 60D is to the right of lane segment 60C.

The segmentation module 40 identifies the plurality of lane segments 60 based on a plurality of lane edge points 64 (seen in FIG. 3), road or skeleton trajectory information 66, road object location information 68, and intersection location information 70. The road object location information 68 indicates markings upon the roadway 14 that guide vehicles such as, for example, a stop bar, a turn arrow, or a straight arrow. The plurality of edge points 64 are determined based on both the perception data 24 and the map data 26. The skeleton trajectory information 66 represents an approximate location and direction of a center of the roadway 14 by one or more lines located at the center of the roadway 14, and is determined based on the map data 26, the road object location information 68 is determined based on the perception data 24 and the map data 26, and the intersection location information 70 is determined based on the perception data 24 and the map data 26.

Continuing to refer to FIGS. 2 and 3, the preprocessing block 50 of the segmentation module 40 receives the plurality of lane edge points 64 and the skeleton trajectory information 66 as input and performs spline-based smoothening and up-sampling to reduce the effects of noise and improve resolution of the data representative of the plurality of lane edge points 64 and the skeleton trajectory information 66. The skeleton trajectory information 66 is used as a reference to sample a set of lane edge points 64 and a distance between one of the lane edge points 64 of the set of lane edge points 64 and the center of the roadway 14. The plurality of lane edge points 64 and the skeleton trajectory information 66 are then sent to the identifier block 52. The identifier block 52 also receives the road object location information 68 as input.

The identifier block 52 executes one or more heuristic-based algorithms to partition the roadway 14 into the plurality of lane segments 60 and assigns the road objects indicated by the road object location information 68 to a specific lane segment 60. The heuristic-based algorithm is a rule-based procedural algorithm that detects spatial changes along a length of the roadway 14 by comparing observations taken along the length of the roadway 14 against as set of predefined rules to determine a change. The change may be, for example, when a new lane edge appears, or when a new lane is available for driving. The heuristic-based algorithm applies one or more rule-driven techniques to partition the roadway 14 into the lane segments 60. The rule-driven techniques partition the roadway 14 by detecting geometrical changes in the roadway 14, where the geometrical changes in the roadway 14 indicate a permitted maneuver is either added to or removed from the roadway 14. The skeleton trajectory information 66 establishes the local orientation of the roadway 14 so that the upstream, downstream, left, and right directions are meaningful and determine the locations of intersections along the roads. Some examples of the geometrical changes in the roadway 14 that indicate a permitted maneuver is added to the roadway 14 include, but are not limited to, lane splits in the roadway 14, merge lanes in the roadway 14, and road markings (e.g., left turn arrow, etc.) that are newly introduced along the roadway 14. For example, as shown in FIG. 3, the heuristic-based algorithm determines a geometrical change between the lane segment 60A and the lane segments 60B, 60C, 60D, where the geometrical change is a lane merge as the three individual lane segments 60B, 60C, 60D merge into the single lane segment 60A. It is to be appreciated that detecting the geometrical changes is a relatively inexpensive computational technique.

The node adjacency block 54 receives the lane segments 60 determined by the identifier block 52 and connects the plurality of lane segments 60 together based on the spatial relationship with one another to create the lane graph 58 (FIG. 3). As seen in FIG. 2, the node adjacency block 54 includes an upstream/downstream subblock 54A, a left/right subblock 54B, and a terminal subblock 54C. The upstream/downstream subblock 54A determines connectivity between the lane segments 60 based on the spatial relationship between lane segments 60 in the upstream and downstream direction, while the left/right subblock 54B determines connectivity between the lane segments 60 based on the spatial relationship between the lane segments 60 in a left and right direction. The terminal subblock 54C receives the intersection location information 70, which indicates information regarding intersectional space 88 in the roadway 14 (FIG. 3). The terminal subblock 54C identifies terminal lane segments 60, which represent either a first or last lane segment 60 in the lane graph 58. The terminal subblock 54C then determines connectivity between the terminal lane segments 60 in the intersectional space 88 based on the spatial relationship between the terminal lane segments 60. In an embodiment, the node adjacency block 54 determines the spatial relationship between lane segments 60 based on geometric computation, which is computationally inexpensive. In the alternative, one or more machine-learning technique such as, for example, binarized image processing and flood-fill algorithms may be implemented to identify partitions (the identifier block 52) and determine connectivity (the node adjacency block 54), however, it is to be appreciated that machine-learning techniques may be computationally expensive.

Figure 4:
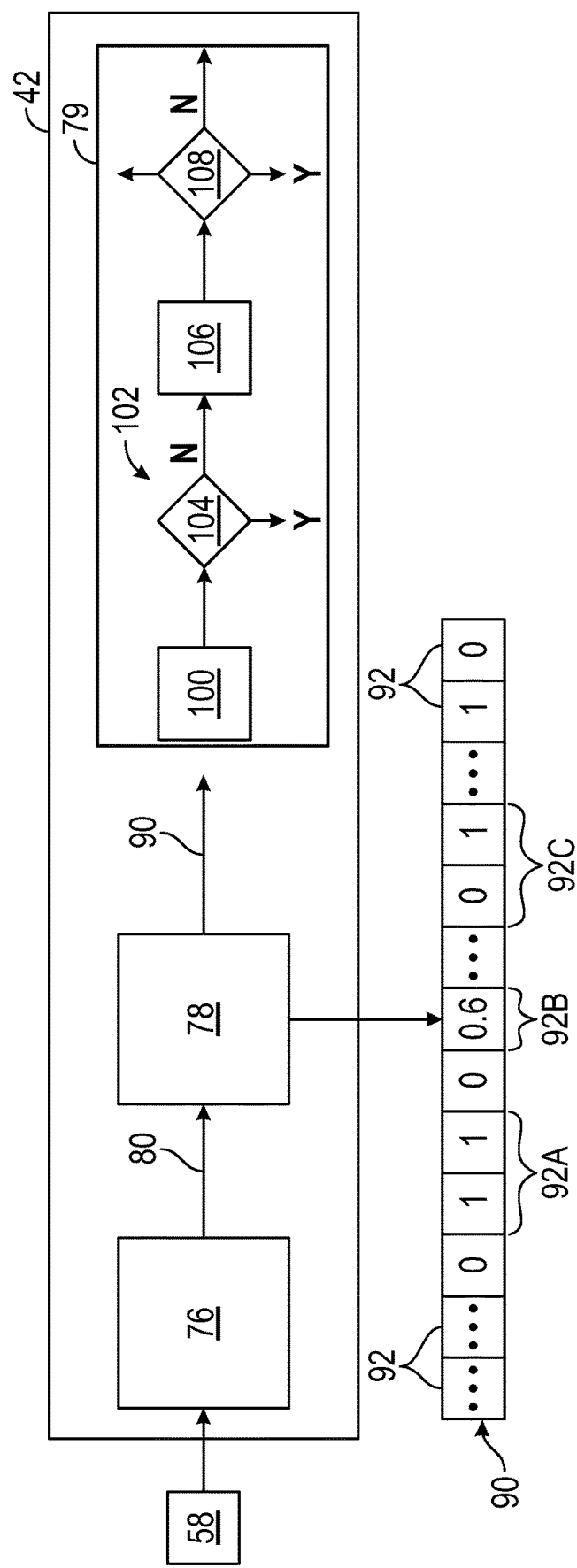
FIG. 4 a block diagram of a classifier module that is part of the one or more controllers shown in FIG. 1, according to an exemplary embodiment.

Referring back to FIG. 1, the segmentation module 40 sends the lane graph 58 to the classifier module 42. FIG. 4 is a is a block diagram of the classifier module 42. As explained in detail below, the classifier module 42 receives the lane graph 58 as input and classifies each lane segment 60 of the lane graph 58 to one or more lane attributes, where the lane attributes represent one or more permitted maneuvers associated with each lane segment 60. The classifier module 42 includes a simplification block 76, a feature extraction block 78, and a classification block 79. The simplification block 78 of the classifier module 42 builds a node map 80, which is shown in FIG. 5.

Figure 5:
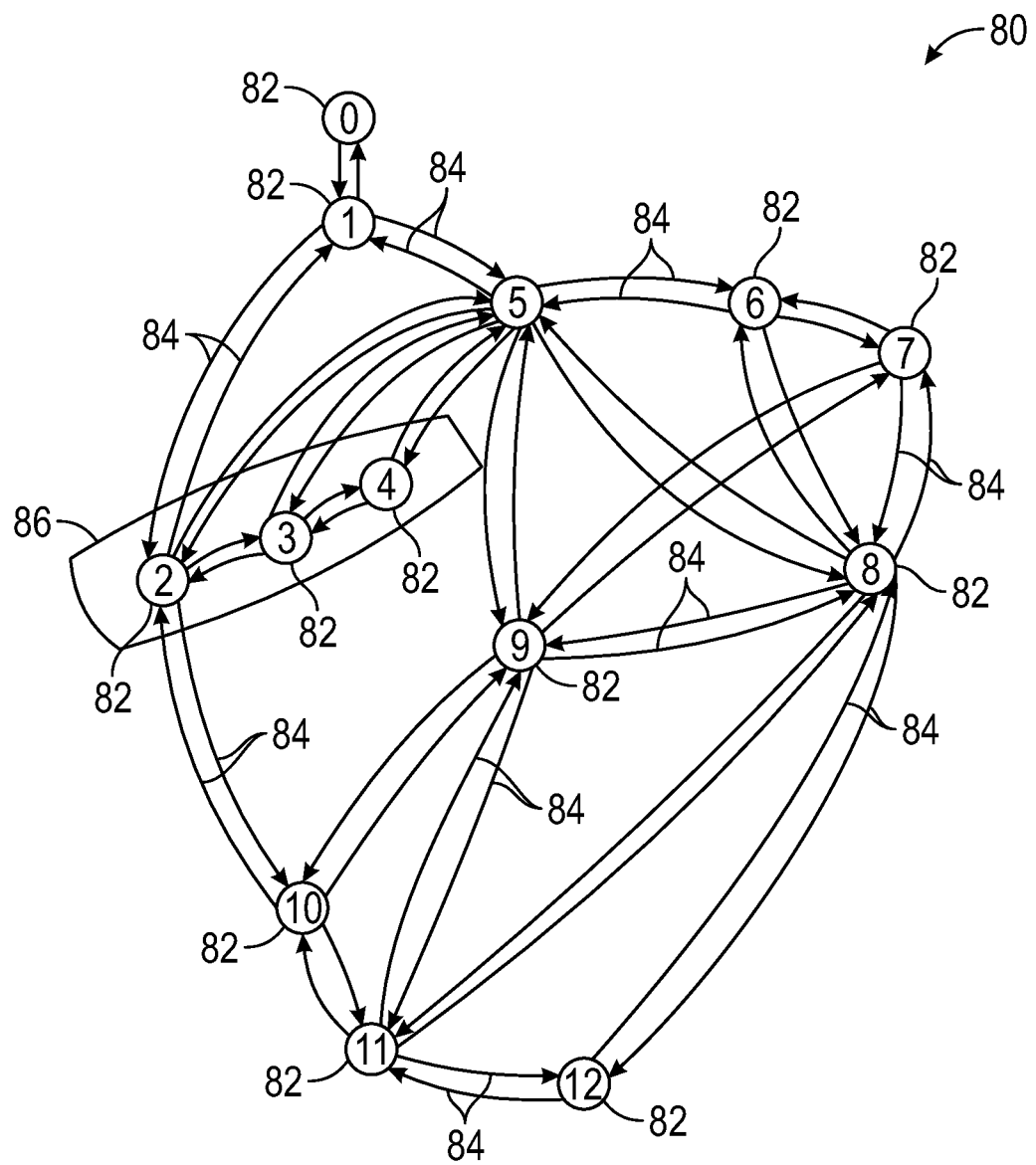
FIG. 5 is an illustration of a node graph built by the classifier module shown in FIG. 4, according to an exemplary embodiment.

Referring to both FIGS. 4 and 5, the node map 80 represents the lane graph 58 as a network of interconnected nodes 82, where each lane segment 60 of the lane graph 58 (FIG. 3) is represented by a node 82. The nodes 82 of the node map 80 are connected to one another by edges 84. The edges 84 signify the spatial relationship between the lane segments 60 (i.e., upstream, downstream, left, and right).

Each node 82 is classified based on the lane attributes (i.e., straight, turn left, turn right, bi-directional, parking, etc.). In an embodiment, the node map 80 is simplified by merging the nodes 82 having the same lane attribute. For example, as shown in FIG. 5, since nodes 2, 3, and 4 include the lane attribute (e.g., straight), then a line 86 is drawn around nodes 2, 3, and 4 to show that they are merged together.

The feature extraction block 78 receives the node map 80 as input and builds a feature vector 90 for each node 82 that is part of the node map 80. The feature vector 90 is a numerical representation of one or more characteristics of a corresponding node 82, one or more characteristics of the neighboring nodes 82 that are connected to the corresponding node 82, and the spatial relationship between the corresponding node 82 and the neighboring nodes 82. Some examples of characteristics that the numerical representation of the feature vector 90 include, but are not limited to, roadway markings, lane width, lane length, lane boundary type, lane boundary. Examples of roadway markings include traffic markings such as a dashed yellow line or a double yellow line and guidance markings. Some examples of guidance markings include a stop bar, a turn arrow, or a straight arrow.

In the example as shown in FIG. 4, the feature vector 90 includes a plurality of values 92 to indicate the characteristics of the corresponding node 82, one or more characteristics of the neighboring nodes 82 that are connected to the corresponding node 82, and the spatial relationship between the corresponding node 82 and the neighboring nodes 82. The value 92A includes digits "11" to indicate the left edge of the corresponding node 82 includes a double yellow line, and the value 92B includes "0.6" to indicate a confidence value for a corresponding characteristic. The value 92C includes digits "01" to indicate the corresponding node has a lane width between 3 to 4 meters. The value 92D includes the digit "1" to indicate only one lane segment 60 is located downstream of the corresponding node 82.

The classification block 79 of the classifier module 42 receives the feature vector 90 for each node 82 that is part of the node map 80 as input and executes heuristic-based logic to classify a corresponding lane segment 60 for a particular feature vector 90 to one or more particular lane attributes. As mentioned above, the lane attribute represents one or more permitted maneuvers associated with each lane segment 60. In one embodiment, the classification block 79 includes a look-up table 100 and a logic tree 102. The look-up table 100 and logic tree 102 first check the corresponding lane segment 60 of a particular feature vector 90 for a special lane attribute before executing the heuristic-based logic to classify the lane attributes, where the special lane attributes have potential to be misclassified based on the heuristic-based logic. As an example, sometimes a turn lane may have the potential to be misclassified by the heuristic-based logic in the event a turn lane marker is obstructed.

In an embodiment, the feature vector 90 may be converted into hexadecimal format, and is then compared with values in the look-up table to determine if the feature vector 90 matches a value corresponding to a first special lane attribute in the look-up table 100 to identify the first special lane attribute. It is to be appreciated that converting the feature vector 90 to hexadecimal format is optional and is performed for efficiency. In one non-limiting embodiment, a hash function is applied to the feature vector 90 and the look-up table 100 is a hash look-up table.

In decision block 104 of the logic tree 102, if the feature vector 90 matches the value corresponding to a first special lane attribute in the look-up table 100, then the first special lane attribute is identified. However, if the feature vector 90 does not match the value corresponding to the first special lane attribute in the look-up table 100, the logic tree 102 may proceed to block 106. In block 106, the feature vector 90 is compared with values in the look-up table to determine if the feature vector 90 matches a value corresponding to a second special lane attribute in the look-up table 100 to identify the second special lane attribute. In decision block 108, if the feature vector 90 matches the value corresponding to the second special lane attribute in the look-up table, then the second special lane attribute is identified. It is to be appreciated that the logic tree 102 may continue for as long as special lane attributes exist.

Once all of the special lane attributes have been identified, the classification block 79 applies the heuristic-based logic to classify the lane attribute to the corresponding lane segment 60 (FIG. 3) for the feature vector 90. The heuristic-based logic applies rule-driven techniques to classify the corresponding lane segment 60 based on the plurality of values 92 of the feature vector 90. Specifically, the heuristic-based logic determines the characteristics of the corresponding node 82 (FIG. 5), the one or more characteristics of the neighboring nodes 82 that are connected to the corresponding node 82, and the spatial relationship between the corresponding node 82 and the neighboring nodes 82 based on the plurality of values 92 of the feature vector 90, and then applies one the rule-driven techniques to classify the corresponding lane segment 60. For example, the feature vector 90 shown in FIG. 4 includes value 92C to indicate the corresponding node has a lane width between 3 to 4 meters. The heuristic-based logic may determine that the corresponding lane segment 60 for the feature vector 90 is not wide enough to be classified as a split lane attribute based on the width. As another example, the value 92D of the feature vector 90 indicates only one lane segment 60 is located downstream of the corresponding lane segment 60, and therefore the corresponding lane segment 60 is not classified as a split lane attribute.

In one embodiment, instead of determining the feature vector 90 by the feature extraction block 78 and applying the heuristic-based logic to classify the lane attribute to the corresponding lane segment 60 for the feature vector 90, the classification may be performed by one or more machine-learning techniques such as a graph neural network. For validation and machine learning training purposes, a ground truth dataset is created based on the lane graph 58 (FIG. 3) determined by the segmentation module 40 (FIG. 2) and annotated with expected classification categories.

Referring to FIGS. 1, 3, and 5, the classifier module 42 transmits the node map 80 and the lane attribute for each lane segment 60 that is represented by a node 82 that is part of the node map 80 to the scene building module 44. The scene building module 44 first reassembles the lane segments 60 back together based on the spatial relationship between the plurality of lane segments 60 (FIG. 3) and the lane attribute for each lane segment 60 to create a representation of the roadway 14. As mentioned above, the node map 80 includes the nodes 82 that are classified based on the lane attributes, and the edges 84 signify the spatial relationship between the nodes 82, which each represent one of the lane segments 60. The scene building module 44 then recreates the scene of the environment surrounding the autonomous vehicle 12 based on the representation of the roadway 14. The scene of the environment surrounding the autonomous vehicle 12 is then transmitted to the autonomous vehicle planner 46.

Figure 6:
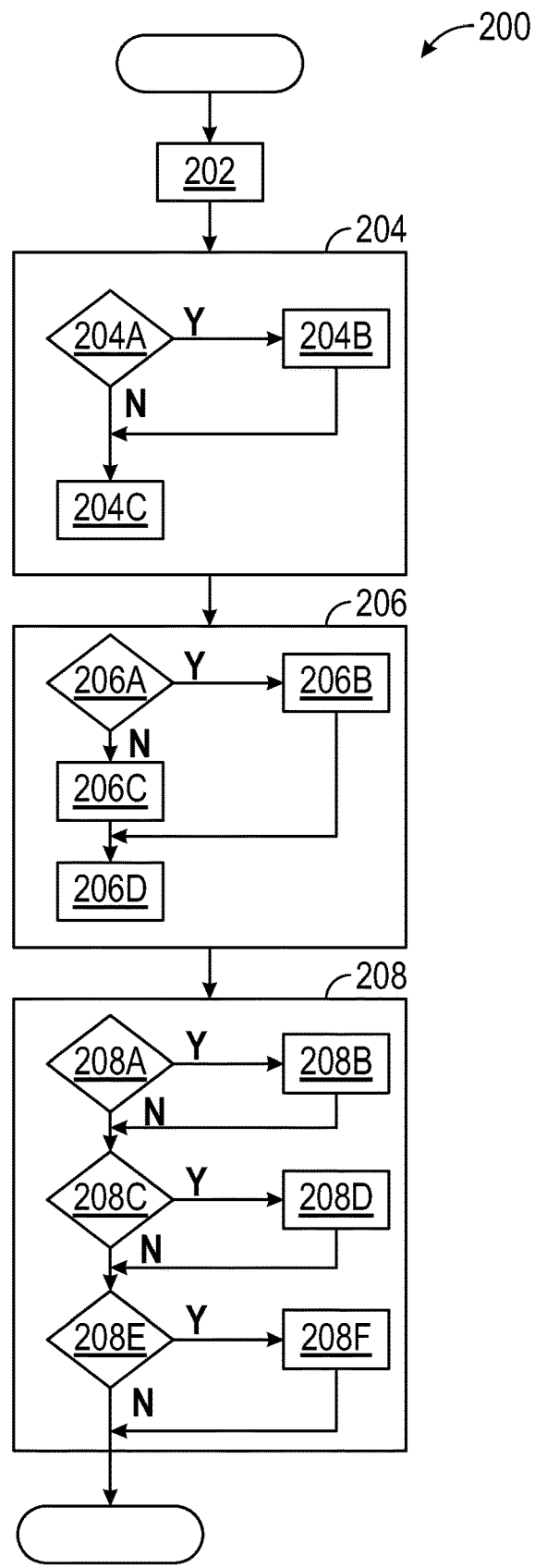
FIG. 6 is a process flow diagram illustrating a method for recreating a scene by the scene creation system, according to an exemplary embodiment.

FIG. 6 is an exemplary process flow diagram illustrating a method 200 for recreating the scene of the environment surrounding the autonomous vehicle 12 based on the representation of the roadway 14. Referring generally to FIGS. 1-6, the method 200 may begin at block 202. In block 202, the scene building module 44 assigns the plurality of lane edge points 64 (seen in FIG. 3) into corresponding lane segments 60 based on the lane attributes. As mentioned above, the lane segments 60 have been classified into lane attributes by the classifier module 42. The method 200 may proceed to block 204.

In block 204, the scene building module 44 builds lanes that are part of the roadway 14 by extending the lane segments 60 (FIG. 3) that are a primary lane. Specifically, in decision block 204A, the scene building module 44 determines if each lane segment 60 that is drivable is a primary lane. A primary lane is a lane that proceeds straight through an intersection or through splits, and merges with the least amount of lateral deviation in trajectory. If the lane segment 60 is a primary lane, then the method proceeds to block 204B to extend the lane segment 60 upstream and downstream depending on the conditions, otherwise the method proceeds to block 204C. The method 200 may continue extend the lane segment 60 until the lane segment 60 is no longer a primary lane. The method 200 may then proceed to block 204C, where the scene building module 44 assembles left and right lane edge points 64 (seen in FIG. 3) for a sequence of lane segments 60 that were extended upstream and downstream. The method 200 may then proceed to block 206.

In block 206, the scene building module 44 builds roads that are part of the roadway 14 based on a driving direction of neighboring lane segments 60. Specifically, in decision block 206A, for each lane segment 60 that is part of the roadway 14, the scene building module 44 compares a length of the selected lane segment 60 with a neighboring lane segment 60. In response to determining the neighboring lane segment 60 is longer in length, the method proceed to block 206B, and skips the selected lane segment 60. The method 200 may then proceed to block 204D. In response to determining the selected lane segment 60 is longer than the neighboring lane segment 60, the method 200 proceeds to block 206C. In block 206C, the scene building module 44 adds a leftmost lane segment 60 having the same driving direction to the selected lane segment 60. If applicable, the scene building module 44 also adds a rightmost lane segment 60 having the same driving direction to the selected lane segment 60. The method 200 may then proceed to block 206D, where the left and right edge points 64 (FIG. 3) are assembled to the selected lane segment 60. The method 200 may then proceed to block 208.

In block 208, the scene building module 44 builds maneuvers that are assigned to each lane of the roadway 14. Specifically, in decision block 208A, for each lane, the scene building module 44 determines if the lane segments 60 corresponding to the lane include an intersection turn. If the scene building module 44 determines an intersection turn exists, the method 200 may proceed to block 208B, otherwise the method proceeds to decision block 208C. In block 208B, the scene building module 44 defines a maneuver from a start lane to a destination lane. The method 200 may then proceed to decision block 208C. In decision block 208C, the scene building module 44 determines, for each lane, if the lane segments 60 corresponding to the lane include a lane split. If the scene building module 44 determines the lane split exists, the method proceed to block 208D, otherwise the method 200 proceed to decision block 208E. In block 208D, the scene building module 44 defines the maneuver from a primary lane or turn lane to the present lane. The method 200 may then proceed to decision block 208E. In decision block 208E, the scene building module 44 determines if the present lane terminates at a lane merge. If scene building module 44 determines the present lane terminates at a lane merge, the method proceeds to block 208F, otherwise the scene is built and the method 200 terminates.

Referring generally to the figures, the disclosed scene building system provides various technical effects and benefits. It is to be appreciated sometimes the map data may include missing or inaccurate information, and the perception data may include noise or inaccurate information. The disclosed scene creation system alleviates the missing or inaccurate information as well as noise by providing an approach to create a lane graph composed of a plurality of lane segments of the roadway, classify the lane segments, reassemble the lane segments, and recreate a scene of the environment surrounding the autonomous vehicle based on the lane segments. The disclosed approach suppresses noise that is found in the perception data, and also creates a scene having an improved representation of the environment surrounding the vehicle when compared to the map or perception data alone. Furthermore, the lane graph of homogenous lane segments creates a simplified representation of the environment surrounding the vehicle, which in turn reduces processing.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A scene creation system for an autonomous vehicle, the scene creation system comprising:
one or more controllers executing instructions to:
receive perception data and map data of a roadway the autonomous vehicle is traveling along;
identify a plurality of lane segments of the roadway that the autonomous vehicle travels along based on the perception data and the map data;
connect the plurality of lane segments together based on a spatial relationship between the plurality of lane segments to create a lane graph;
classify each of the plurality of lane segments of the lane graph to at one or more lane attributes, wherein the lane attributes represent one or more permitted maneuvers associated with each lane segment;
reassemble the plurality of lane segments based on the spatial relationship between the plurality of lane segments and the lane attributes for each lane segment to create a representation of the roadway; and
recreate a scene of an environment surrounding the autonomous vehicle based on the representation of lanes that are part of the roadway.

2. The scene creation system of claim 1, wherein the one or more controllers execute a heuristic-based algorithm that applies one or more rule-driven techniques to partition the roadway into the lane segments.

3. The scene creation system of claim 2, wherein the rule-driven techniques partition the roadway by detecting geometrical changes in the roadway.

4. The scene creation system of claim 3, wherein the geometrical changes in the roadway indicate a permitted maneuver is added to the roadway.

5. The scene creation system of claim 1, wherein the spatial relationship between the lane segments includes one of the following: upstream, downstream, left, and right.

6. The scene creation system of claim 1, wherein the one or more controllers classify the plurality of lane segments by:
building a node map that represents the lane graph as a network of interconnected nodes, wherein each of the plurality of lane segments of the lane graph are represented by a node.

7. The scene creation system of claim 6, wherein the one or more controllers classify the plurality of lane segments by:
building a feature vector for each node that is part of the node map; and
executing a heuristic-based logic to classify a corresponding lane segment for a particular feature vector to one or more particular lane attributes.

8. The scene creation system of claim 7, wherein a look-up table and a logic tree first check the corresponding lane segment for the particular feature vector to for a special lane attribute before executing the heuristic-based logic.

9. The scene creation system of claim 7, wherein the nodes of the node map are connected to one another by edges, and wherein the edges signify the spatial relationship between the lane segments.

10. The scene creation system of claim 7, wherein the feature vector is a numerical representation of one or more characteristics of a corresponding node, one or more characteristics of neighboring nodes connected to the corresponding node, and the spatial relationship between the corresponding node and the neighboring nodes.

11. The scene creation system of claim 1, wherein the lane attributes include one or more of the following: straight, turn left, turn right, bi-directional, split, and parking.

12. The scene creation system of claim 1, wherein the one or more controllers execute instructions to:
transmit the scene to an autonomous vehicle planner.

13. The scene creation system of claim 1, wherein recreating the scene includes:
building lanes that are part of the roadway by extending the plurality of lane segments that are a primary lane;
building roads that are part of the roadway based on a driving direction of neighboring lane segments; and
building maneuvers that are assigned to each lane.

14. A method for recreating a scene of an environment surrounding an autonomous vehicle by a scene creation system, the method comprising:
receiving, by one or more controllers, perception data and map data of a roadway the autonomous vehicle is traveling along;
identifying, by the one or more controllers, a plurality of lane segments of the roadway that the autonomous vehicle travels along based on the perception data and the map data;
connecting, by the one or more controllers, the plurality of lane segments together based on a spatial relationship between the plurality of lane segments to create a lane graph;
classifying, by the one or more controllers, each of the plurality of lane segments of the lane graph to more or more lane attributes, wherein the lane attributes represent one or more permitted maneuvers associated with each lane segment;
reassembling, by the one or more controllers, the plurality of lane segments based on the spatial relationship between the plurality of lane segments and the lane attributes for each lane segment to create a representation of the roadway;
recreating, by the one or more controllers, a scene of an environment surrounding the autonomous vehicle based on the representation of the roadway; and
transmitting the scene to an autonomous vehicle planner.

15. A scene creation system for an autonomous vehicle, the scene creation system comprising:
one or more controllers executing instructions to:
receive perception data and map data of a roadway the autonomous vehicle is traveling along;
identify a plurality of lane segments of the roadway that the autonomous vehicle travels along based on the perception data and the map data;
connect the plurality of lane segments together based on a spatial relationship between the plurality of lane segments to create a lane graph;
classify each of the plurality of lane segments of the lane graph to one or more lane attributes, wherein the lane attributes represent one or more permitted maneuvers associated with each lane segment, wherein the one or more controllers classify a feature vector by:
building a node map that represents the lane graph as a network of interconnected nodes, wherein each of the plurality of lane segments of the lane graph are represented by a node, building the feature vector for each node that is part of the node map, and executing a heuristic-based logic to classify a corresponding lane segment for a particular feature vector to one or more particular lane attributes;
reassemble the plurality of lane segments based on the spatial relationship between the plurality of lane segments and the lane attributes for each lane segment to create a representation of the roadway; and
recreate a scene of an environment surrounding the autonomous vehicle based on the representation of the roadway.

16. The scene creation system of claim 15, wherein the one or more controllers execute a heuristic-based algorithm that applies one or more rule-driven techniques to partition the roadway into the lane segments.

17. The scene creation system of claim 16, wherein the rule-driven techniques partition the roadway by detecting geometrical changes in the roadway.

18. The scene creation system of claim 17, wherein the geometrical changes in the roadway indicate a permitted maneuver is added to the roadway.

19. The scene creation system of claim 15, wherein the spatial relationship between the lane segments includes one of the following: upstream, downstream, left, and right.

20. The scene creation system of claim 15, wherein a look-up table and a logic tree first check the corresponding lane segment for the particular feature vector to for a special lane attribute before executing the heuristic-based logic.

\* \* \* \* \*